Sept. 9, 1952          E. E. SIVACEK          2,609,796
STOPPING CONTROL VALVE MECHANISM FOR EXPANSIBLE CHAMBER
FLUID MOTORS WITH PISTON ACTUATED DISTRIBUTING VALVE
Filed Nov. 23, 1944          5 Sheets-Sheet 1
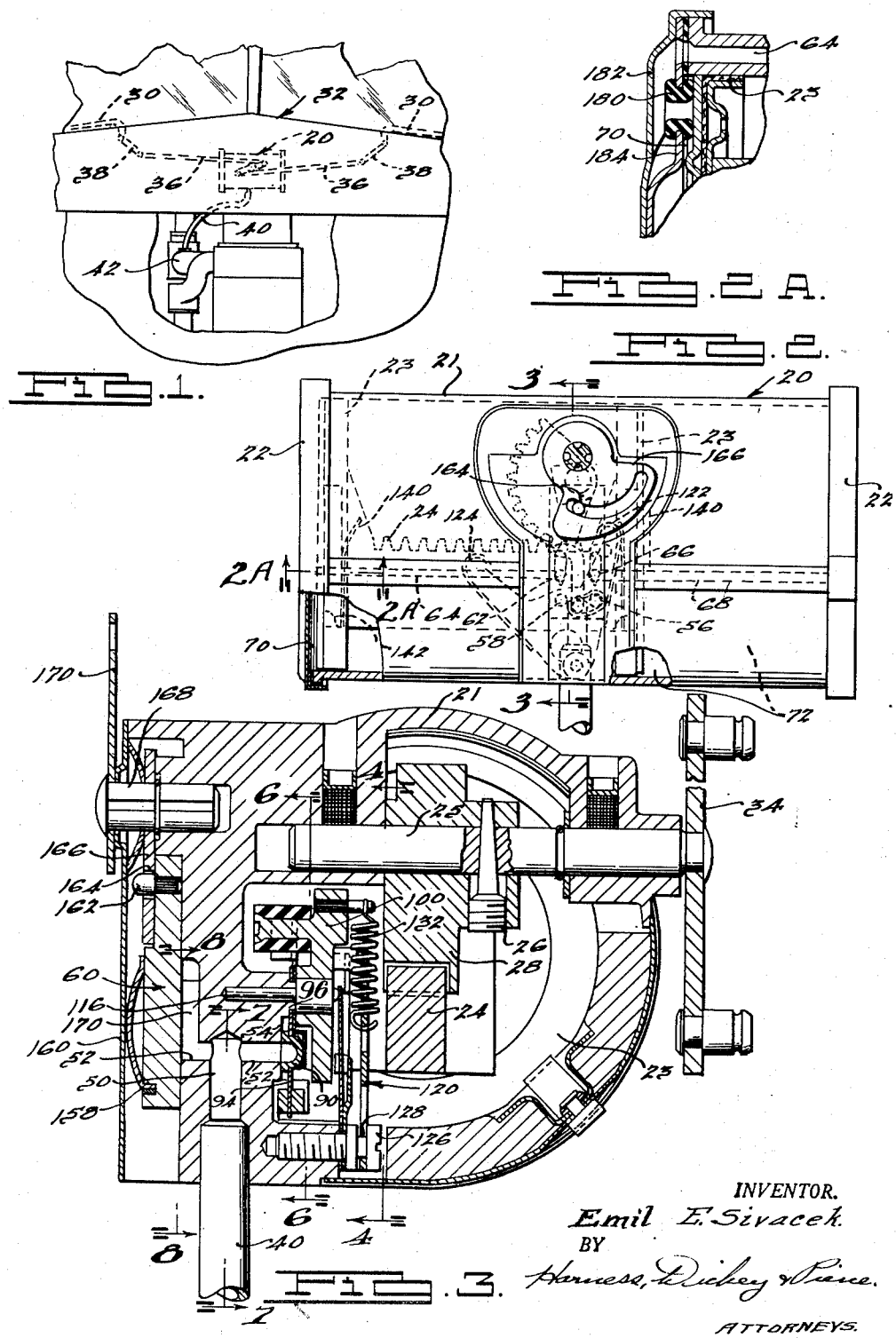
INVENTOR.
Emil E. Sivacek.
BY
Harness, Dickey & Pierce.
ATTORNEYS.

Sept. 9, 1952          E. E. SIVACEK          2,609,796
STOPPING CONTROL VALVE MECHANISM FOR EXPANSIBLE CHAMBER
FLUID MOTORS WITH PISTON ACTUATED DISTRIBUTING VALVE
Filed Nov. 23, 1944          5 Sheets-Sheet 2
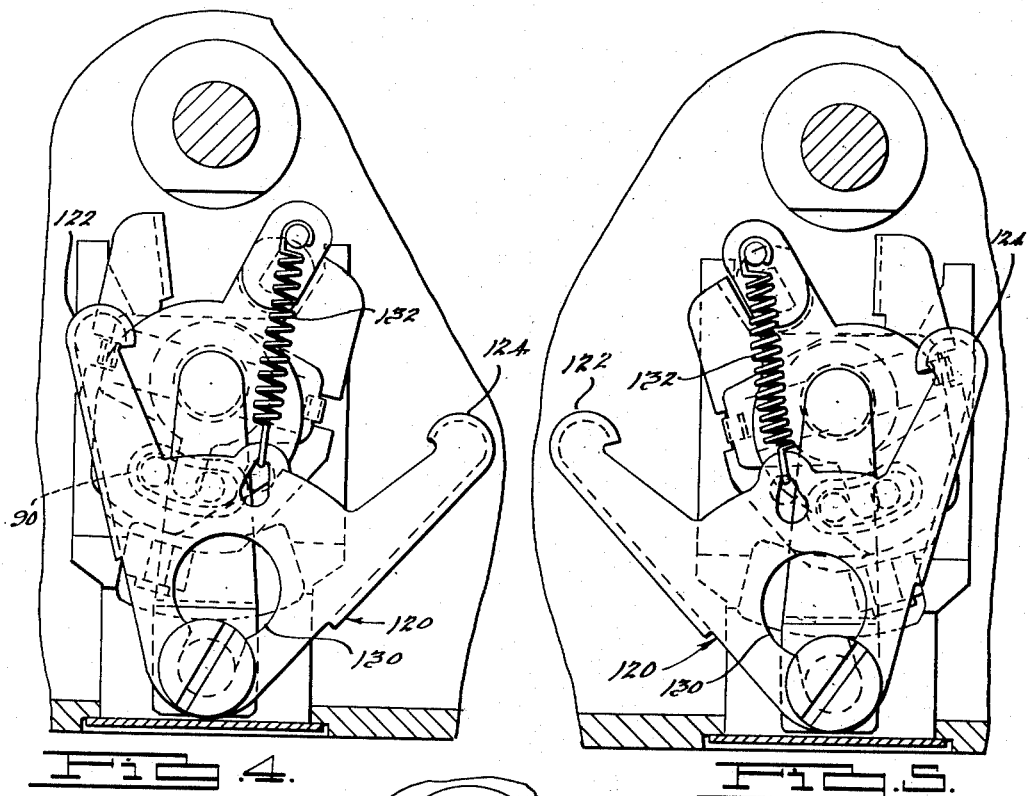
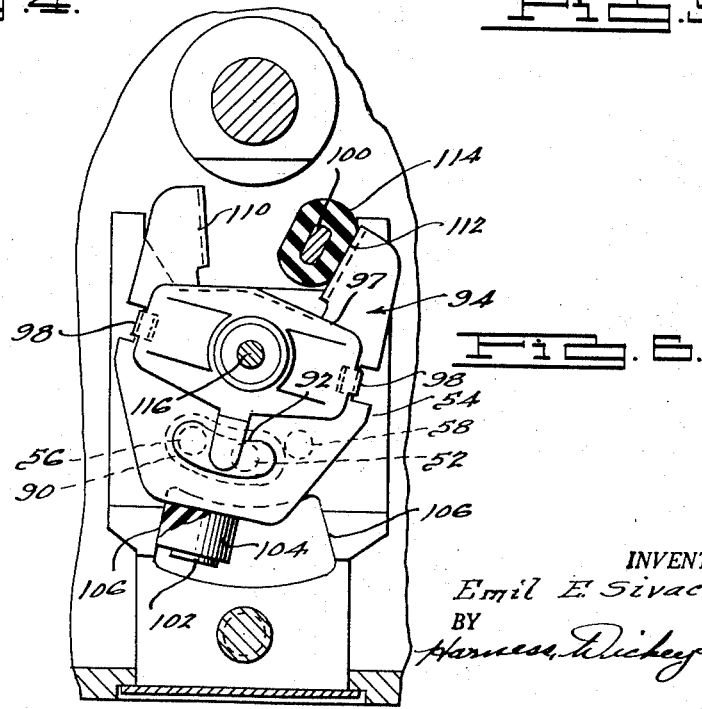
INVENTOR.
Emil E. Sivacek.
BY
Harness, Dickey & Pierce
ATTORNEYS.

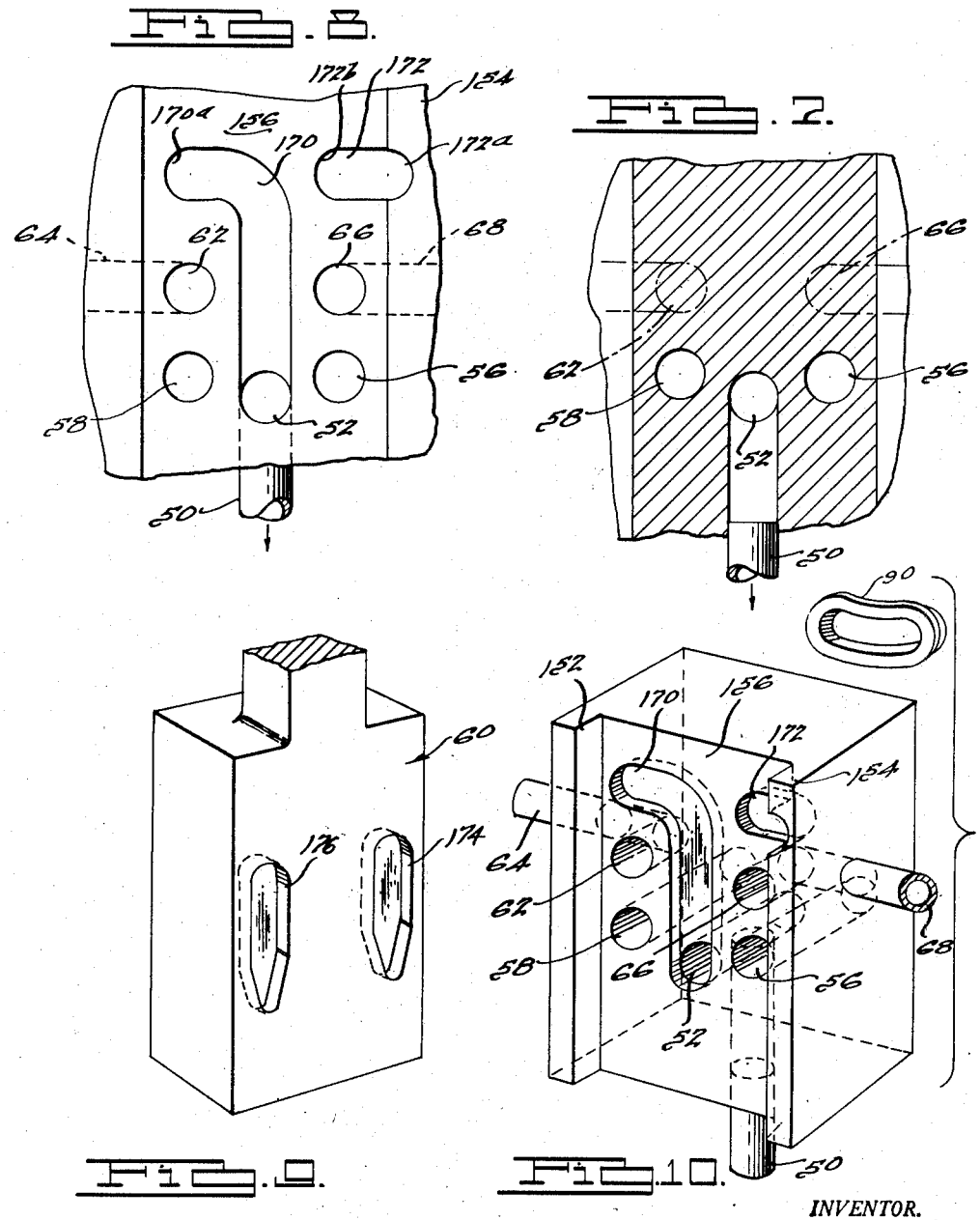

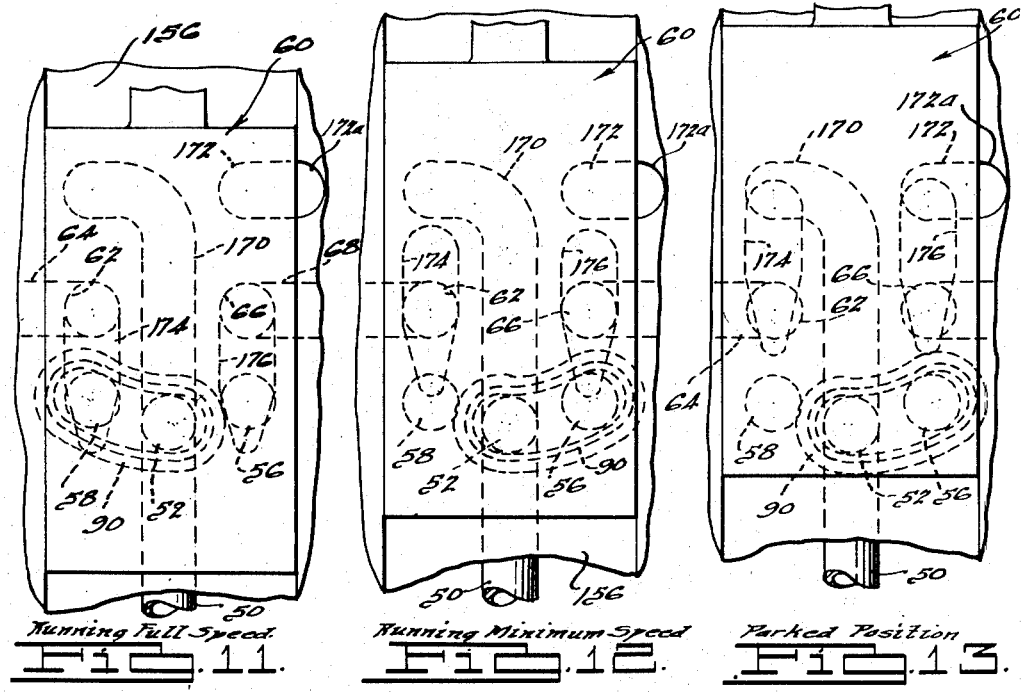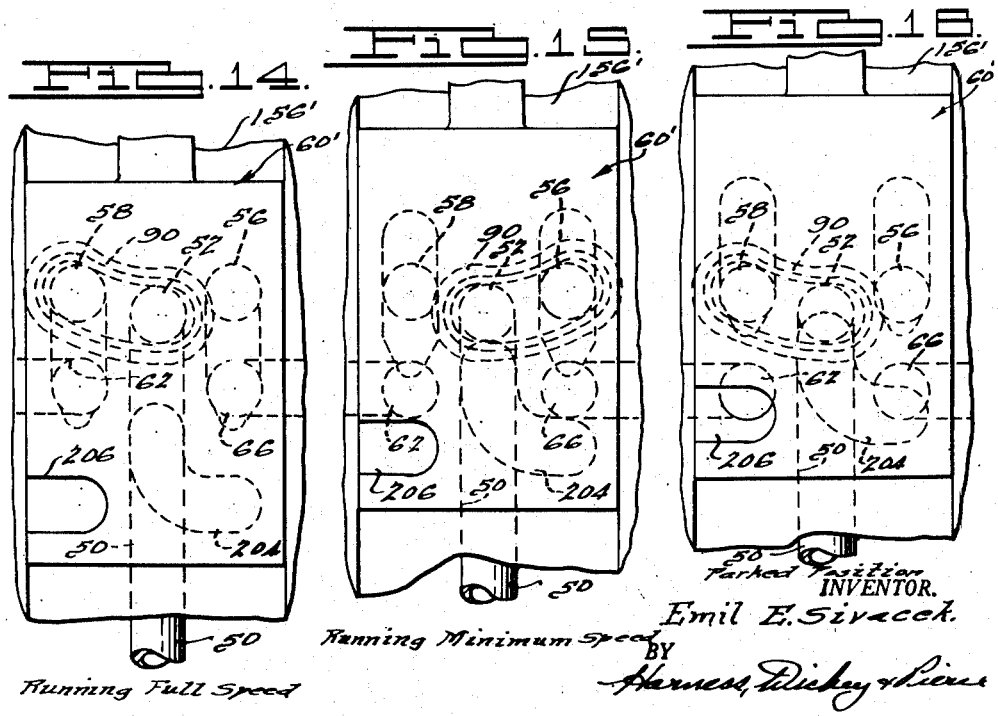

Sept. 9, 1952 E. E. SIVACEK 2,609,796
STOPPING CONTROL VALVE MECHANISM FOR EXPANSIBLE CHAMBER
FLUID MOTORS WITH PISTON ACTUATED DISTRIBUTING VALVE
Filed Nov. 23, 1944 5 Sheets-Sheet 5
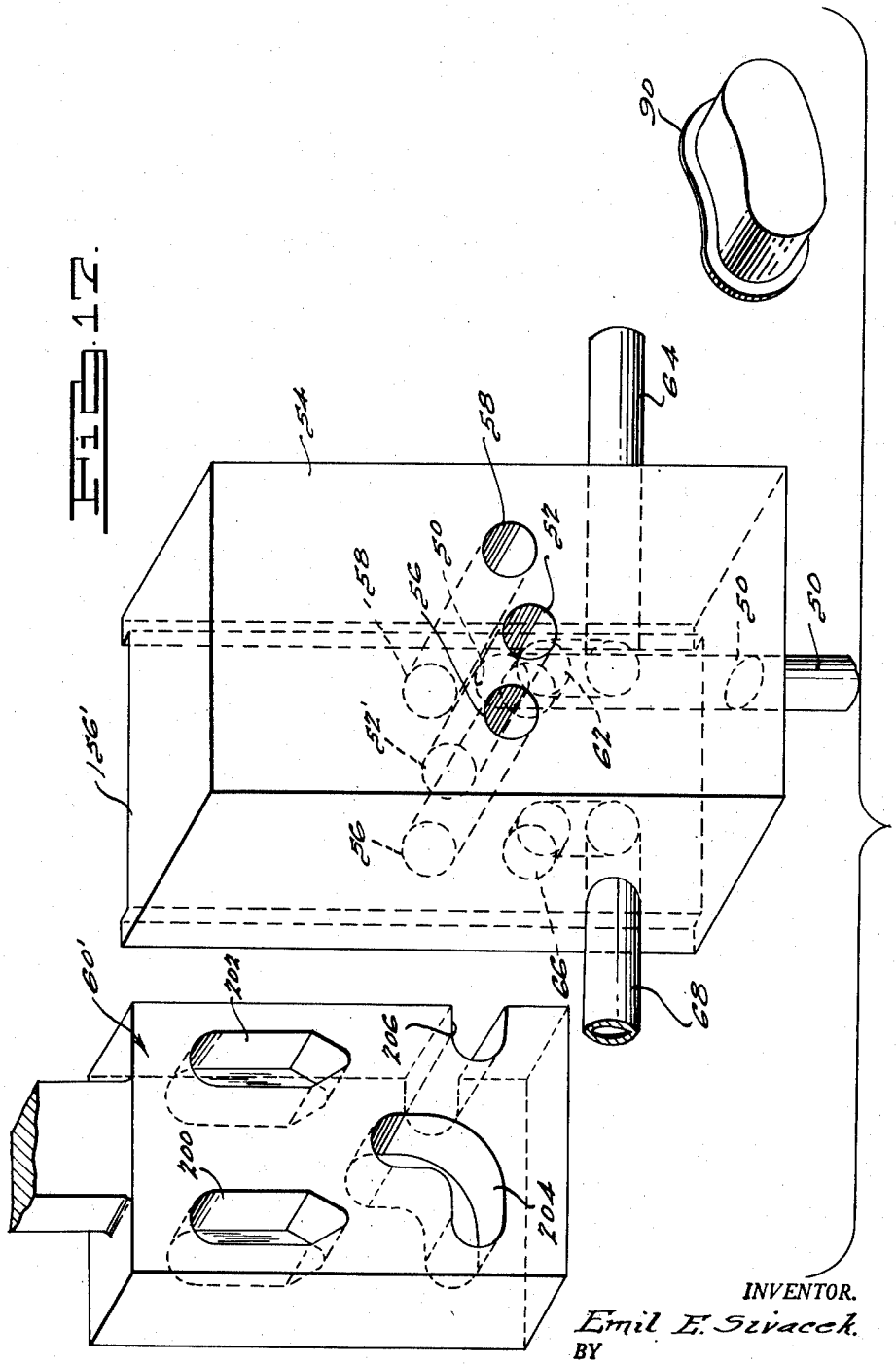
INVENTOR.
Emil E. Sivacek.
BY
Harness, Dickey & Pierce
ATTORNEYS.

Patented Sept. 9, 1952

2,609,796

UNITED STATES PATENT OFFICE 2,609,796

STOPPING CONTROL VALVE MECHANISM FOR EXPANSIBLE CHAMBER FLUID MOTORS WITH PISTON ACTUATED DISTRIBUTING VALVE

Emil E. Sivacek, Ann Arbor, Mich., assignor to King-Seeley Corporation, Ann Arbor, Mich., a corporation of Michigan Application November 23, 1944, Serial No. 564,829

10 Claims. (Cl. 121—164)

The present invention relates to fluid motor mechanisms, and more particularly, to the provision, in such mechanisms, of improved means for stopping the movable member of the motor at a desired position, hereinafter referred to as a parking or parked position. In its illustrated embodiment, the present mechanism is of general utility, but is particularly well adapted to serve as a source of power for the windshield wiper system of an automotive vehicle.

Principal objects of the present invention are to provide a fluid motor mechanism of the above generally indicated type, which is simple in construction, economical of manufacture and assembly, and which is reliable and efficient in operation; to provide such a mechanism embodying a member which is movable, under the influence of fluid pressure, between normal limits, and further embodying improved means for causing the movable member to move to and remain at rest at a parked position which may be at or beyond one of such limits; to provide such mechanism embodying automatically operable reversing valve mechanism which normally controls the application of fluid pressure to the movable member, and further embodying a selectively operable control member which can be operated to establish fluid connections which cause the movable member to move to and come to rest at a said parked position; to provide such mechanism wherein the just-mentioned control member is effective, when moved to parking position, to interrupt the fluid connections associated with the automatic reversing valve mechanism, and to establish a new set of connections which cause the parking action; and to generally improve and simplify the construction and arrangement of mechanisms of the above type.

With the above as well as other and more detailed objects in view, preferred but illustrative embodiments of the invention are shown in the accompanying drawings, throughout the several views of which corresponding reference characters are used to designate corresponding parts and in which:

Figure 1 is a somewhat diagrammatic view, illustrating the application of the invention to a windshield wiper system.

Fig. 2 is a view in side elevation of the fluid motor of Fig. 1.

Fig. 2-A is an enlarged fragmentary view of a portion of Fig. 2, taken along line 2A—2A of Fig. 2.

Fig. 3 is a view in vertical transverse section, taken along the line 3—3 of Fig. 2.

Fig. 4 is a view in vertical transverse section, taken along the line 4—4 of Fig. 3.

Fig. 5 is a view corresponding to Fig. 4 but showing the valve elements in opposite position.

Fig. 6 is a view in section, taken along the line 6—6 of Fig. 3.

Figs. 7 and 8 are fragmentary views, taken along the lines 7—7 and 8—8 of Fig. 3.

Figs. 9 and 10 are views in perspective which show the parking control valve, portions of the automatic reversing valve, and the valve block which is interposed therebetween.

Figs. 11, 12, and 13 are somewhat diagrammatic views illustrating the indicated operating positions of the parking control valve.

Figs. 14, 15, and 16 are somewhat diagrammatic views showing the indicated operating positions of the parking control valve for a modification of the invention and Fig. 17 is an exploded perspective view showing the parking control valve, automatic valve, and the associated valve block associated with the just-mentioned modification.

It will be appreciated from a complete understanding of the present invention, that in their broader aspects, the improvements thereof may be embodied in fluid motor mechanisms of widely differing types and sizes, and particularly designed for widely differing particular applications. In an illustrative but not in a limiting sense, the present improvements are herein disclosed as being embodied in a fluid motor, particularly suited for windshield wiper purposes, and of the type specifically disclosed and claimed in Bell Patent No. 2,354,189, granted July 25, 1944.

Referring to the drawings, the improved motor 20 comprises generally a cylindrical housing or cylinder 21, which is provided with removable end closures 22. Cylinder 21 slidably receives a piston assembly, comprising a pair of spaced pistons 23, which are rigidly secured to a connecting rack 24. The motor shaft 25, which is rotatably journaled in bearings provided therefor in the cylinder 21 has fixed thereon, as by a pin 26, a gear segment 28, which continuously meshes with the rack 24. Accordingly, reciprocating movements of the piston assembly are translated into oscillatory or rocking movements of the shaft 25. The piston assembly is shown in Fig. 2 in its left-hand limit, or parking, position.

In the illustrated embodiment motor 20 is utilized to drive a pair of windshield wipers 30 associated with an automobile 32. Consequently, shaft 25 is provided with a crank 34, which is adapted for connection, through links 36 to cranks 38 associated with the respective wipers.

It will be appreciated that the piston movements are effected by applying differential pressures in the chamber spaces between each piston 23 and the corresponding end closure 22, the space between the pistons 23 being continuously vented to atmosphere in the illustrated instance. These differential pressures may, of course, be obtained from any suitable source. In the present instance, utilizing the motor 20 to drive a windshield wiper system, the pressure differential which is utilized is the difference between atmospheric pressure and a sub-atmospheric pressure obtained in usual fashion by connecting motor 20 through line 40, to the intake manifold 42 of the associated automobile. In accordance with conventional practice, the motor 20 is provided with automatic reversing valve mechanism of the snap action type, which responds to the travel of the motor, and automatically reverses the applied fluid pressure differential at each normal limit of the stroke of the motor. This automatic reversing valve mechanism is illustrated, by way of example, as being of the type described in the aforesaid patent, and consequently, needs only a brief description herein.

Referring to Figs. 3, 4, 5, and 6, the suction line 40 communicates, through a passage 50, with a horizontal passage 52 which opens through the face 54 of a valve seat which is illustrated as being formed integrally with the cylinder 21. Seat 54 is also provided with spaced chamber ports 56 and 58, which, under running conditions, communicate with the chamber spaces 70 and 72 at the left and right-hand ends of the cylinder 21 (Fig. 2).

The connection between ports 56 and 58 and the respective chambers 70 and 72 is controlled by the hereinafter described control valve 60, which, when in running position connects port 58 to chamber 70 through communicating passages 62 and 64; and connects port 56 to chamber 72 through communicating passages 66 and 68.

Under running conditions, further, the alternate connection of ports 56 and 58 to atmosphere and to the sub-atmospheric passage 52, is controlled by a valve assembly which comprises a usual hood valve 90. It will be appreciated that valve 90 has a cavity therein of sufficient length so that in one of its left-hand limit positions, (Figs. 4 and 6), it interconnects ports 52 and 56, and consequently connects the motor chamber 72 to the sub-atmospheric line 40. This tends to cause rightward piston travel, as viewed in Fig. 2. In its right-hand limit position, (Fig. 5), it spans ports 52 and 58, and consequently connects the motor chamber 70 to the sub-atmospheric line 40, thereby tending to cause leftward piston travel as viewed in Fig. 2. In each limit position, the remaining port, 56 or 58, as the case may be, is exposed to the chamber space between the pistons, which is continuously vented to atmosphere.

Hood valve 90 is received in an arcuate slot 92 provided therefor in a valve actuator 94, which is pivotally mounted on a bearing defined by the reduced outer end portion 96 of a bearing boss which may be and preferably is formed integrally with the cylinder 12. A generally rectangular shaped leaf spring 97, having a downwardly projecting finger which bears against the hood valve 90, serves to retain the latter in place against the valve seat 54. Spring 97 is also fitted over the reduced end 96 of the previously mentioned boss, and is retained in place relative to the valve actuator 94, by means of the reversely turned fingers 98. (Fig. 6). The actuator 94 and spring 97 are retained in place on the reduced end 96, by the hereinafter described kicker 100.

At its lower end, the valve actuator 94 is provided with a downwardly extending portion 102, which carries a resilient buffer 104. Buffer 104 cooperates with spaced stops 106 which may be and preferably are formed integrally with the cylinder 21. Stops 106 thus serve to limit the travel in either direction of the valve actuator 94, each limit position of this member corresponding to one of the previously described operating positions of the hood valve 90.

The upper end of the valve actuator 94 is formed to define a pair of spaced legs 110 and 112, which cooperate with a resilient buffer 114 carried by the previously mentioned kicker 100. Kicker 100 is mounted for limited pivotal movement, about the axis of pivotal movement of the valve actuator 94, by means of a pin 116 which is received in the previously mentioned boss.

The illustrated valve mechanism also includes a pivoted spring carrier 120, of generally V-shape, having spaced legs 122 and 124. Spring carrier 120 is pivoted to the cylinder, by means of a stud 126, having an annular groove 128 therein which receives the lower end of the carrier. The latter is provided with a keyhole slot 130, which enables it to be fitted over the head of stud 126. The kicker 100 and carrier 120 are interconnected by an over center spring 132 which, in each operative position of the valve mechanism, lies to one side or the other of the axis of pivotal movement of the valve actuator 94. In Figure 4, for example, spring 132 is effective to urge kicker 100 in a counter-clockwise direction, holding its bumper 114 in engagement with the right-hand leg 112 of the valve actuator and consequently holding the latter in its clockwise or left-hand limit position. In Figure 5, an opposite condition obtains as will be evident. It will be appreciated that Figs. 4, 5, and 6, on the one hand, and Fig. 2, on the other hand, are taken from respectively opposite sides of the motor 20. Consequently, in Figs. 4 and 6, the valve parts are in position to cause the piston assembly to move to the right, as viewed in Fig. 2; in Fig. 5, the valve parts are in position to cause the piston assembly to move to the left in Fig. 2.

Carrier 120 is disposed to be moved by the piston assembly. More particularly, as the piston assembly moves to the left, (Figs. 4–6), the right-hand carrier arm 124 is initially engaged by a cushioning spring 140, carried by the rack 24 at one end thereof. (Fig. 2). Such engagement initiates a counter-clockwise swinging of the carrier from the position shown in Figures 4 and 6. At a later stage of this piston movement, an accelerated carrier movement is effected, by bringing a shoulder 142 formed on rack 24 into engagement with arm 124 of the carrier 120. As will be appreciated, this movement of the carrier shifts the lower end of the over center spring 130 towards the axis of pivotal movement of the valve actuator 94. (Figs. 4–6). At a time after the lower end of the over center spring moves to the left of the just-mentioned axis, but while the line of action of the spring still is slightly displaced to the right of such axis, the upper end of the carrier arm 124 engages the upper end of the kicker 100, enabling continued carrier movement to positively carry the upper end of the spring 132 to the left of the just-mentioned axis. As soon as this position is attained, spring 132 becomes effective to urge kicker 100 in a counter-clockwise direction. During the course of this movement, kicker 100 sharply strikes the left-hand arm 110 of valve actuator 94, snapping the latter to the right-hand position shown in Fig. 5. As will be appreciated from previous description, this action reverses the fluid connections for the motor, and establishes connections which cause a reverse or leftward travel of the piston assembly. (Figs. 4, 5, and 6). Shortly before the normal right-hand limit position of the motor is reached, the spring 140 associated with the left-hand carrier arm 122 engages the latter and initiates a rightward swing of the carrier 120. Shortly thereafter, the rate of this carrier movement is accelerated by the engagement of a corresponding shoulder on rack 24. The clockwise swinging movement of carrier 120 positions the lower end of spring 132 to the right of the axis of pivotal movement of the actuator 94 and thereafter effects a positive movement of the kicker 100, by virtue of the engagement between the arm 122 and the upper end of the kicker. This positive kicker movement brings the line of action of the spring 132 to the right of the just-mentioned axis and snaps the kicker to the position of Figs. 4 and 6. During the course of this snapping movement, buffer 114 strikes the right-hand arm 112 of the valve actuator 94 and forces the latter to the position shown in Figs. 4, 5, and 6, re-establishing the fluid circuits needed to cause leftward travel of the motor as viewed in Figs. 4, 5, and 6, or rightward travel thereof as viewed in Fig. 2.

It will be appreciated from the foregoing description accordingly that so long as the control valve 60 occupies the aforesaid running position, motor 20 is caused to oscillate between its normal left-hand and right-hand limit positions, the parking position shown in Fig. 2 being beyond the normal left-hand limit position.

In accordance with the illustrated embodiment of the present invention, the previously mentioned parking control valve 60 is movable between a running position in which it enables completion of the previously described fluid circuits between the chamber ports 56 and 58 and the corresponding piston chambers 72 and 70, and the parking position shown in Figs. 2 and 3. In the parking position, control valve 60 isolates the chamber ports 56 and 58 from the respective piston chambers, and establishes new connections between chamber 70 and the suction line 40 on the one hand, and between chamber 72 and the atmosphere on the other. It will be appreciated that valve 60 may be moved from the running position to the parked position at any stage of the piston movement. When so moved, valve 60 immediately establishes connections, as aforesaid, which cause the motor to move to and remain at the parked position.

More particularly, and referring to Figs. 2, 3, and 7 through 13, valve 60 is in the form of a slide, which is guided by the side walls 152 and 154 which project outwardly from the left-hand face of the cylinder 21, as viewed in Fig. 3. The flat surface 156 which lies between side walls 152 and 154, constitutes a valve seat, against which valve 60 is yieldingly pressed by spring 158. As shown in Fig. 3, one end of spring 158 is imbedded in the valve 60 and the arched central portion of this spring is engaged by the removable cover plate 160. Valve 60 is provided with an outwardly projecting pin 162 which rides in a cam slot 164 formed in an operating cam 166 which is swingable from the parked position of Fig. 2 to a running position which is spaced from the parked position, in a clockwise direction, by an angle of approximately 60 degrees. Cam 166 is fixed on a pin 168, which can be rotated by any suitable remote operator, indicated as comprising the control arm 170.

The previously described ports or passages 52, 56, and 58 are drilled through from the previously described valve seat 54 to the seat 156. In addition, seat 156 is provided with the previously mentioned ports 62 and 66, which continuously communicate with passages 64 and 68, which extend longitudinally of the motor, and open into the piston chambers 70 and 72.

In addition to the above described ports, seat 156 is provided with a blind cavity 170 of inverted L-shape, which opens at one end into the central passage 52. Finally, seat 156 is provided with a blind cavity 172, one end 172a cuts into the guide wall 154.

Valve 60 is provided with a pair of identical longitudinally extending laterally spaced blind cavities 174 and 176, which are of sufficient length, so that cavity 174, for example, is enabled to span ports 58 and 62, or to span port 62 and the turned end 170a of the blind cavity 170. Cavity 176, on the other hand, is of sufficient length to span ports 58 and 66, or to span port 66 and the left-hand portion 172b of cavity 172.

The full speed running position of valve 60 is shown in Fig. 11. In this figure, it will be noted, control cavity 174 spans ports 62 and 58, and control cavity 176 spans ports 56 and 66. Under these conditions, further, cavities 170 and 172 are inactive. The operating circuit for chamber 70 thus extends from this chamber through passages 64 and 62, cavity 174, passage 58, the automatically controlled hood valve 90, and passages 52 and 50 to the suction line (Fig. 3). Similarly, the atmospheric connection for chamber 72 extends from the exposed end of passage 56 (valve seat 54) through this passage, cavity 176, and passages 66 and 68 to chamber 72. It will be evident that if the position of valve 90 is reversed, chamber 70 is connected to atmosphere and chamber 72 is connected to the suction line. So long, therefore, as control valve 60 occupies the position of Fig. 11, the motor is caused to operate at full speed, the length of stroke being determined by the operating positions of the automatic valve 90, as effected in the previously described manner.

It will be noticed that the lower ends of cavities 174 and 176 are of tapered form. Consequently, valve 60 is withdrawn from the full speed position of Fig. 11 towards the minimum running speed position of Fig. 12, the effective sizes of cavities 174 and 176 are progressively reduced, thereby restricting the rate of airflow therethrough and correspondingly reducing the speed of the motor.

It will further be understood that if valve 60 is withdrawn to the parked position of Fig. 13, passages 56 and 58 are rendered ineffective, since the left-hand ends thereof (considering Fig. 3) are closed off by the body of valve 60. Under these conditions, passage 52 still opens through seat 54, but the end of this passage is bridged by hood valve 90, independently of which of its two operating positions is occupied by the latter. In the parked position, cavities 174 and 176 serve respectively to interconnect passage 62 and cavity 170, and to interconnect passage 66 and cavity 172. In this position, accordingly, valve 60 is effective to establish a new suction connection for chamber 70, which extends through passages 64 and 62, cavities 174 and 170, and passages 52 and 50 to the suction line 49. Similarly, an atmospheric connection for chamber 72 is established, which extends from the exposed end 172a of cavity 172, through the body of this cavity, cavity 176, and passages 66 and 68 to chamber 72.

Movement of valve 60 from a running position to the parked position, therefore, immediately interrupts the then existing chamber supply circuits, and establishes the just traced new supply circuits. Independently, therefore, of the direction in which the motor is moving, or its position between its normal limits, movement of valve 60 to parked position causes the motor to immediately move towards its parking position.

In the illustrated and preferred embodiments of the invention, this parking position is beyond the left-hand normal reversing point of the motor (Fig. 2). In further accordance with the preferred practice of the invention, the parking limit is established by the engagement between the left-hand piston 23 and the corresponding end of the cylinder 21. Such engagement is preferably utilized to close off the suction circuit for chamber 70. In the present embodiment, such closing off is effected by providing the just-mentioned cylinder closure 22 with a rubber grommet 180, or equivalent element, which affords a passage from chamber 70 into the space between the two laminations 182 and 184 of which such end closure 22 is composed. The previously mentioned passage 64 also opens into the space between members 182 and 184, which members may directly engage each other except throughout a relatively small segmental area needed to define the just-mentioned connection between passages 64 and chamber 70. When the pistons reach their parking position of Fig. 2, the left-hand piston 23 directly engages grommet 180, is resiliently brought to rest thereby, and serves to close off the passage through the latter, thereby preventing any tendency for an air circulation past the pistons when the motor is parked. It will be recognized that if, for any reason, the motor moves slightly away from the parked position, the grommet passage is re-opened, thereby re-establishing the circuits needed to cause the motor to return to the parked position.

It will be noticed that if the motor is moving towards the parked position at the time the parking valve is moved to parked position, the arrival of the motor at its normal reversing point will cause a normal throw-over action of the automatic hood valve 90, establishing this valve in position to cause rightward travel of the motor as viewed in Fig. 2. Such reversal of valve 90 is without effect under the conditions stated. On the other hand, if valve 60 is moved to parking position, at a time when the motor is moving away from parked position, its return movement to and past the normal left-hand limit (Fig. 2) does not cause a throw-over action of valve 90, since, under these conditions, valve 90 is already in the position to which it is normally moved by the arrival of the motor at the normal left-hand limit. In either event, valve 90 always occupies a position, when the motor is parked, tending to cause rightward travel of the motor, as viewed in Fig. 2. As soon, therefore, as valve 60 is moved to a running position, proper circuits are established to start the motor away from the parked position.

It will be noticed also that in traveling to the parked position, the previously described rack shoulder 142 associated with the right-hand piston 23 remains effective to swing the spring carrier 120 associated with valve 90 through a longer arc than normal, this additional movement of the spring carrier is readily permitted, since it serves only to elongate spring 132 somewhat (Fig. 5). The parts are so adjusted that the parking position is attained before any limit to such continued swinging of carrier 120 is reached.

The modified embodiment of the invention shown in Figs. 14 through 17 is functionally equivalent to the just described embodiment, but employs a somewhat different porting arrangement. In this embodiment, seat 156' is provided with ports duplicating those described in connection with seat 156, with the exception that passage 52 extends straight through the valve block and, its outer end being designated 52'. Valve 60' is provided with blind cavities 200, 202, and 204, and a notch 206. In the running position of the parts, cavities 200 and 202 correspond in function to the previously described control cavities 174 and 176, and serve respectively to bridge ports 56 and 66 on the one hand, and ports 58 and 62 on the other hand. Under these conditions, notch 206 and cavity 204 are ineffective, as appears from an inspection of Figures 14 and 15, and the operating circuits for the motor are as traced in detail in connection with the description of the first embodiment. Similarly, valve 60', by being withdrawn towards the parked position, effects a speed control in the previously described manner.

If valve 60' is moved to the parking position, cavities 200 and 202 move entirely out of registry with passages 66 and 58, but remain effective to close off the outer ends of passages 56 and 38. With passages 56 and 58 thus closed off, any passage to which the suction line 50 is connected by valve 90 is blind and, consequently, valve 90 is no longer effective to exert any control over the motor.

In the parked position, further, valve 60' enables cavity 204 to bridge ports 66 and 52', thereby continuously connecting the piston chamber associated with line 66 to the suction line 50. In the parked position also, valve 60' brings notch 206 into registry with port 62, thereby continuously connecting the other piston chamber to atmosphere.

Movement of valve 60' to parked position thus causes the motor to immediately move towards the parking position in the previously described manner, such parking movement being interrupted when the piston assembly encounters a limit to its position. When such mechanical limit is reached, the suction line is preferably closed off in the previously described manner. It will be noticed that in the embodiment now being described, the parking position is opposite to that described in connection with Figures 1 through 13. It will be appreciated, accordingly, that to accommodate this relationship, the other cylinder head may be provided with a control grommet in the manner described in connection with Figure 2. If desired, of course, the motor passages 64 and 68 may both lead to their corresponding piston chambers through control grommets, independently of whether the parking position is at one end of the motor or the other.

Although only two specific embodiments of the invention have been described in detail, it will be appreciated that various further modifi-

What is claimed is:

1. Control mechanism for a fluid motor having a chamber and piston means in the chamber which define first and second chamber spaces therein, said piston means being movable relative to the chamber under the influence of the differential between first and second fluid pressures in said respective chamber spaces, said mechanism having a pair of spaced stationary valve seats including a valve seat having a supply port adapted for connection to a region at one of said pressures and a pair of chamber ports associated respectively with said spaces, automatic valve means movable over said seat between spaced positions, said valve means being disposed in each position to connect a corresponding one of said chamber ports to said supply port and to expose the other port to a region at the other said pressure, and a control valve movable over the other of said seats and operable in one position to connect each chamber port to a corresponding chamber space, said control valve being effective in another position to disconnect both said chamber ports from the corresponding said spaces and to establish fluid circuits which cause the piston means to move in one direction relative to the chamber, said control valve also being effective in said another position to close off said chamber ports.

2. Control mechanism for a fluid motor having a chamber and piston means in the chamber which define first and second chamber spaces therein, said piston means being movable relative to the chamber under the influence of the differential between first and second fluid pressures in said respective chamber spaces, said mechanism having a pair of spaces stationary valve seats including a valve seat having a supply port adapted for connection to a region at one of said pressures and a pair of chamber ports associated respectively with said spaces, automatic valve means movable over said seat between spaced positions, said valve means being disposed in each position to connect a corresponding one of said chamber ports to said supply port and to expose the other port to a region at the other said pressure, and a control valve movable over the other of said seats and operable in one position to connect each chamber port to a corresponding chamber space, said control valve being effective in another position to disconnect both said chamber ports from the corresponding said spaces and to establish fluid circuits which directly connect one said chamber space to a region at one said pressure and the other chamber space to a region at the other said pressure, said control valve also being effective in said another position to close off said chamber ports.

3. Control mechanism for a fluid motor having a chamber and piston means in the chamber which define first and second chamber spaces therein, said piston means being movable relative to the chamber under the influence of the differential between first and second fluid pressures in said respective chamber spaces, said mechanism including a valve seat having ports associated respectively with said spaces and chamber ports associated with said reversing valve means, an automatic reversing valve means responsive to movement of said piston means relative to said chamber, and a control valve movable between first and second positions, said valve being effective in one position to connect said first named ports to said chamber ports and render said ports subject to control by said reversing valve whereby to cause said motor to reciprocate between normal limits, said control valve being effective in said other position to disconnect both said first named ports from said chamber ports and to complete circuits to cause said piston means to move in one direction relative to said chamber, said control valve also being effective in said other position to close off said chamber ports.

4. Control mechanism for a fluid motor having a chamber and piston means in the chamber which define first and second chamber spaces therein, said piston means being movable relative to the chamber under the influence of the differential between first and second fluid pressures in said respective chamber spaces, said mechanism including a valve seat having ports associated respectively with said spaces and chamber ports associated with said reversing valve means, an automatic reversing valve means responsive to movement of said piston means relative to said chamber, and a control valve movable between first and second positions, said valve being effective in one position to connect said first named ports to said chamber ports and render said ports subject to control by said reversing valve whereby to cause said motor to reciprocate between normal limits, said control valve being effective in said other position to disconnect both said first named ports from said chamber ports and to complete circuits which connect one said port to a region at one said pressure, and connect the other said port to a region at the other said pressure, said control valve also being effective in said other position to close off said chamber ports.

5. In a fluid motor having a cylinder and a piston therein for dividing the cylinder into a plurality of chamber spaces, closure means for said spaces including inner and outer laminations having spaced portions which define an auxiliary chamber, the inner said lamination having a port leading into the corresponding said first-mentioned chamber space, and a grommet mounted on said inner lamination and disposed within said port, said piston means being adapted to seat against said grommet at one limit of its movement and seal said port.

6. In a device of the class described, a motor having a casing including a member movable therein being subject to a fluid pressure differential, primary chamber ports located on opposite sides of said movable member, a pair of spaced stationary valve seats including a valve seat on said casing including a suction supply port and secondary chamber ports adjacent thereto, the secondary ports and the primary chamber ports leading to fluid passages, automatic valve means associated with said valve seat and controllable by the movable member for connecting the suction supply port alternately with one secondary port, and the other secondary port to the atmosphere to obtain reversal of pressure differential for the operation of said movable member, control valve mechanism associated with the other of said seats and having fluid passages forming continuations of the passages of the primary chamber ports and valve seat ports, said continuation passages leading to ports on said control valve mechanism located adjacent to a vent port in communication at all times with the atmosphere, the control valve mechanism operable in one position to connect the suction supply to the primary chamber ports through the secondary chamber ports for the operation of the movable member and in a second position to connect one of the primary chamber ports directly to the suction supply and the other primary chamber port to the vent port on the control valve mechanism to park the movable member in one position.

7. Control mechanism for a fluid motor having a chamber and piston means in the chamber which co-operate therewith to define first and second chamber spaces therein, said piston means being movable relative to the chamber back and forth between normal limits under the influence of the differential between first and second fluid pressures in said respective chamber spaces; said mechanism including means defining a pair of spaced stationary valve seats; means defining a supply passage adapted for connection to a source of one of said pressures and opening through both of said valve seats at all times; one of said seats having a pair of first ports associated respectively with said spaces; automatic valve means movable over said one of said seats between first and second positions; said valve means being disposed in each position to connect a corresponding one of said ports to said supply passage and expose the other to a region at the other of said pressures; the other of said seats having a pair of second ports respectively communicating at all times with said first ports, a pair of third ports respectively communicating at all times with said spaces, and a vent port; and a control valve movable over said other of said seats between first and second positions; said control valve being operable in said first position to connect said pair of first ports respectively to said spaces and in which said automatic valve means is operable to alternately connect said spaces to said supply passage, and said control valve being operable in said second position to disconnect both of said pair of first ports from said spaces, to close off said pair of second ports, and to establish fluid circuits which cause the piston means to move in one direction relative to the chamber.

8. Control mechanism for a fluid motor having a chamber and piston means in the chamber which co-operate therewith to define first and second chamber spaces therein, said piston means being movable relative to the chamber back and forth between normal limits under the influence of the differential between first and second fluid pressures in said respective chamber spaces; said mechanism including means defining a pair of spaced valve seats; means defining a supply passage adapted for connection to a source of one of said pressures and opening through at least one of said seats; one of said seats having a pair of first ports; automatic valve means movable over said one of said seats between first and second positions and being disposed in each position to connect a corresponding one of said ports to said supply passage and expose the other to a region at the other of said pressures; the other of said seats including a pair of second ports respectively communicating at all times with said first ports; and a control valve movable over said other of said seats between a first position in which it is operable to connect said pair of first chamber ports respectively to said spaces and in which said automatic valve means is operable to alternately connect said spaces to said supply passage and a second position in which it is operable to disconnect both said first chamber ports from said spaces and establish fluid circuits which cause the piston means to move in one direction relative to the chamber.

9. In a fluid motor, first and second members movable relative to each other back and forth between normal limits under the influence of a reversibly applied differential between higher and lower fluid pressures, a supply passage adapted for connection to a source of one of said pressures, and valve mechanism for controlling said motor including means defining spaced stationary valve seats and reversing and control valve elements slidable along said seats for providing running and parking connections between said motor and said passage and between said motor and a source of the other of said pressures, said reversing valve element having a cavity and said supply passage opening through at least one of said seats and communicating at all times with said cavity of said reversing valve element, said parking connections between said motor and said source of the other of said pressures including said control valve independently of the position of said reversing valve, said reversing valve being automatically operable at said limits, said control valve being movable between a first position in which it establishes said running connections and in which said reversing valve is operable to reverse the connection between said passage and said motor and a second position in which it establishes said parking connections and in which said reversing valve is ineffective to so reverse said connection.

10. Control mechanism for a fluid motor having a chamber and piston means in the chamber which define first and second chamber spaces therein, said piston means being movable relative to the chamber under the influence of the differential between first and second fluid pressures in said respective chamber spaces, said mechanism comprising reversing valve means and control valve means for providing running and parking connections to said motor, said control valve means comprising a valve seat having a supply port communicating with a source of one of said fluid pressures, a pair of first ports associated with said reversing valve means, and a pair of second ports communicating directly with said chamber spaces; said reversing valve means being operable for alternately connecting one of said first ports to said source of one of said fluid pressures while exposing the other to a source of the other of said fluid pressures; and a control valve element movable over said seat and having a pair of operating passages and a pair of parking passages, said operating passages being effective in one position of said control valve element to connect said pair of first ports respectively to said pair of second ports, and said parking passages being effective in another position of said control valve element to directly connect one of said second ports to said supply port and directly connect the other of said second ports to a source of said other of said fluid pressures.

EMIL E. SIVACEK.

(References on following page)

REFERENCES CITED

The following references are of record in the file of this patent:

UNITED STATES PATENTS

| Number | Name | Date |
|---|---|---|
| 1,674,056 | Oishei et al. | June 19, 1928 |
| 1,709,682 | Moxley | Apr. 16, 1929 |
| 1,738,311 | Oishei et al. | Dec. 3, 1929 |
| 1,840,233 | Hueber | Jan. 5, 1932 |
| 1,989,846 | Christman | Feb. 5, 1935 |

FOREIGN PATENTS

| Number | Country | Date |
|---|---|---|
| 473,296 | Great Britain | Oct. 11, 1937 |
| 697,976 | France | Nov. 5, 1930 |